US006092220A

United States Patent [19]
Palmer et al.

[11] Patent Number: 6,092,220
[45] Date of Patent: Jul. 18, 2000

[54] METHOD AND APPARATUS FOR ORDERED RELIABLE MULTICAST WITH ASYMMETRIC SAFETY IN A MULTIPROCESSING SYSTEM

[75] Inventors: John Davis Palmer; Hovey Raymond Strong, Jr., both of San Jose; Eliezer Upfal, Palo Alto, all of Calif.

[73] Assignee: International Business Machines Corporation, Armonk, N.Y.

[21] Appl. No.: 08/972,111

[22] Filed: Nov. 17, 1997

[51] Int. Cl.[7] ............................ G06F 11/30
[52] U.S. Cl. ............................ 714/43; 709/220
[58] Field of Search ............. 714/43, 55, 56, 714/749, 814, 815; 709/237, 220; 364/240.9, 241.8

[56] References Cited

U.S. PATENT DOCUMENTS

| | | | |
|---|---|---|---|
| 4,864,559 | 9/1989 | Perlman | 370/60 |
| 5,079,767 | 1/1992 | Perlman | 370/94.3 |
| 5,216,675 | 6/1993 | Melliar-Smith et al. | 371/32 |
| 5,243,596 | 9/1993 | Port et al. | 370/94.1 |
| 5,297,143 | 3/1994 | Fridrich et al. | 370/85.3 |
| 5,317,749 | 5/1994 | Dahlen | 395/725 |
| 5,339,443 | 8/1994 | Lockwood | 395/725 |
| 5,355,371 | 10/1994 | Auerbach et al. | 370/60 |
| 5,392,433 | 2/1995 | Hammersley et al. | 395/725 |
| 5,414,856 | 5/1995 | Yokota | 395/725 |

(List continued on next page.)

OTHER PUBLICATIONS

D. Malki et al., "Uniform Actions in Asynchronous Distributed Systems," Proceedings of the 13th Annual SCM Symposium on Prinicipals of Distributed Computing, 1994, pp. 274–283.

K. Berman et al., "Reliable Distributed Computing with the Isis Toolkit," IEEE Computer Society Press, Los Alamitos, CA 1994.

MPI: A Message–Passage Interface Standard, published by the Univ. of Tennesee, 1994.

D. Dolev et al., "On the Minimal Synchronism Needed for Distributed Consensus", *Journal of the ACM* 34(1), 1987, pp. 77–97.

D. Dolev et al., "A Framework for Partionable Membership Service", Technical Report TR 94–6, Department of Computer Science, Hebrew University.

(List continued on next page.)

*Primary Examiner*—Robert W. Beausoliel, Jr.
*Assistant Examiner*—Scott T. Baderman
*Attorney, Agent, or Firm*—Gray Cary Ware Freidenrich

[57] ABSTRACT

Ordered machine-readable messages are reliably delivered among processing members in a multiprocessing computer system. The system includes multiple processing nodes, each having a unique source-ID and a membership view including one or more of the processing nodes with which it can nominally exchange messages. When a stimulus message is received by a first processing node, the node increments a coordinated local counter (CC). The node also sends a multicast message to all processing nodes in the first node's membership group. The multicast message includes the received stimulus message, the incremented CC value, and the first node's source-ID. The node further sets a timer, exclusively associated with the incremented CC value. When a multicast message is received at a processing node, the node performs a multicast input processing routine. The node sets its CC equal to the greater of its current value or the received multicast message's CC value. The node also sends an acknowledgement message to all processing nodes in its membership group. Also, in response to the multicast message, the node sets a timer, exclusively associated with the received multicast message's CC value. Whenever a node's timer associated with a CC value expires before messages with the same CC value have been received from each of the node's membership group, the node invokes a membership protocol requiring asymmetric safety.

60 Claims, 6 Drawing Sheets

U.S. PATENT DOCUMENTS

| | | | |
|---|---|---|---|
| 5,459,725 | 10/1995 | Bodner et al. | 370/60 |
| 5,463,733 | 10/1995 | Forman et al. | 395/182.08 |
| 5,467,352 | 11/1995 | Cidon et al. | 370/85.5 |
| 5,502,840 | 3/1996 | Barton | 395/726 |
| 5,513,354 | 4/1996 | Dwork et al. | 395/650 |
| 5,519,704 | 5/1996 | Farinacci et al. | 370/85.13 |
| 5,550,973 | 8/1996 | Forman et al. | 395/182.03 |
| 5,612,959 | 3/1997 | Takase et al. | 370/390 |
| 5,623,670 | 4/1997 | Bohannon et al. | 395/726 |
| 5,634,011 | 5/1997 | Auerbach et al. | 395/200.15 |
| 5,666,486 | 9/1997 | Alfieri et al. | 395/200.47 |
| 5,682,470 | 10/1997 | Dwork et al. | 395/182.1 |
| 5,856,972 | 1/1999 | Riley et al. | 370/389 |
| 5,946,316 | 8/1999 | Chen et al. | 370/408 |
| 5,996,075 | 11/1999 | Matena | 713/200 |
| 5,999,712 | 12/1999 | Moiin et al. | 709/220 |

OTHER PUBLICATIONS

F. Jahanian et al., "Processor Group Membership Protocols: Specification, Design and Implementation" *in Proc. of 12th IEEE Symposium on Reliable Distributed Systems*, pp. 2–11–1993.

R. van Renesse et al., "Horus: A Flexible Group Communication System", *Comm. of the ACM*, vol. 39, No. 4, pp. 76–83, 1996.

M. Rosu et al., "Early–Stopping Terminating Reliable Broadcast Protocol for General–Omission Failures", *Proceedings of the 15th ACM Symposium of Principles of Distributed Computing*, 1996, p. 209.

M. Aguilera et al. "Randomization and Failure Detection: A Hybrid Approach to Solve Consensus", *Proceedings of 10th International Workshop on Distributed Algorithms*, Italy 1996, pp. 29–39.

M. Herlihy et al., "Set Consensus Using Arbitrary Objects", *1994 ACM*, pp. 324–333.

G. Bracha et al., "Asynchronous Consensus and Broadcast Protocols", *Journal of the Association for Computing Machinery*, vol. 32, No. 4, Oct. 1985, pp. 824–840.

T. Chandra et al., "The Weakest Failure Detector for Solving Consensus", *Proc. 11th ACM Symposium on Principles of Distributed Computing*, 1992, pp. 147–158.

D. Peleg, "Crumbling Walls: A Class of Practical and Efficient Quorum Systems", *Proc. 14th ACM Symposium on Principles of Distributed Computing*, 1995, pp. 120–128.

M. Fischer et al., "Impossibility of Distributed Consensus with One Faulty Process", *Journal of the Association for Computing Machinery*, vol. 32, No. 2, Apr. 1985, pp. 374–382.

C. Dwork et al., "Collective Consistency", *Proceedings of 10th International Workshop on Distributed Algorithms*, Italy 1996, pp. 234–250.

T. Chandra, "On the Impossibility of Group Membership", *Proceedings of 15th Annual ACM Symposium on Principles of Distributed Computing*, May 1996, pp. 322–340.

METHOD AND APPARATUS FOR ORDERED RELIABLE MULTICAST WITH ASYMMETRIC SAFETY IN A MULTIPROCESSING SYSTEM

CROSS REFERENCE TO RELATED APPLICATIONS

This application is related to application "Method for Coordinating Membership with Asymmetric Safety in a Distributed System", by J. D. Palmer et al., Ser. No. 08/924,811, filed Sep. 5, 1997 and issued as U.S. Pat. No. 5,923,831, which is commonly assigned with this application and incorporated herein by reference.

BACKGROUND OF THE INVENTION

1. Field of the Invention

The present invention relates to multiprocessing computer systems. More particularly, the invention concerns a method and apparatus to reliably deliver ordered machine-readable messages among processing members in a multiprocessing computer system, where failure conditions are addressed by invoking a membership protocol requiring only asymmetric safety.

2. Description of Related Art

Multiprocessing Systems

Multiprocessing computing systems perform a single task using a plurality of processing "elements", also called "nodes", "participants", or "members". The processing elements may comprise multiple individual processors linked in a network, or a plurality of software processes or threads operating concurrently in a coordinated environment. In a network configuration, the processors communicate with each other through a network that supports a network protocol. This protocol may be implemented using a combination of hardware and software components. In a coordinated software environment, the software processes are logically connected together through some communication medium such as an Ethernet network. Whether implemented in hardware, software, or a combination of both, the individual elements of the network are referred to individually as "members", and together as a "group".

The processing elements typically communicate with each other by sending and receiving messages or packets through a common interface. A processing element typically makes a collective call at the common interface, which coordinates the call among a subset of the processing elements. The elements involved in the call are referred to as participants. In many applications, frequently used collective calls are provided in a common communication library such as the industry standard Message Passing Interface. Further details on this standard are described in *"MPI: A Message-Passage Interface Standard,"* published by the University of Tennessee, 1994. The communication library provides not only ease in parallel programming, debugging, and portability but also efficiency in the communication processes of the application programs.

Multicast

In multiprocessing computing systems, the individual nodes cooperate to perform an overall task of the system. A fundamental part of internodal cooperative task performance is the effective delivery of messages among the nodes. As a result, engineers have developed a number of different message delivery or "multicast" techniques. Although the various multicast approaches differ in some ways, each approach typically broadcasts messages to a predefined group called a "membership group".

It is difficult, however, for each node to learn the status of other nodes, as required to most effectively cooperatively perform the overall system tasks. For example, multiprocessing tasks are complicated when one or more nodes fails. Thus, each node cannot proceed without some knowledge of which other nodes have failed, and the other nodes' task completion status. This coordination problem is difficult because many activities occurring are simultaneously in different nodes, and the nodes' statuses change constantly.

Thus, one of the problems associated with multiprocessing systems is that it is impossible to guarantee sufficiently consistent failure detection by the nodes so that each correctly functioning node is guaranteed an accurate and consistent "view" of the current membership. A given member's "view" of the current membership includes all other members for which no notification of communications failure has been received. Because consistency cannot be guaranteed, failure or tardiness of some processing elements may not be consistently detected and reported by the other elements. Inconsistency in these reports makes recovery from system failures difficult.

The problem of keeping the views of the members in the membership accurate and consistent is known as the membership problem. Members join a group because of events external to the cooperative task assigned to the group. Members leave a group either because of such external events or because of a failure of the member or of computing resources on which the member depends. These external and failure events are called membership events. Ideally, within a short time after any membership event, all remaining members of the group would have the same accurate view of the group.

Membership Protocols

As mentioned above, it is often important to determine membership in a multiprocessing system. Specified parameters for establishing group membership collectively form a "membership protocol". An ideal membership protocol would have these features: (1) it is triggered by some membership event, (2) it requires at most a fixed amount of time to complete, (3) it results in complete consistency of views of the remaining members, and (4) each remaining member's view consists of exactly the set of remaining members. This last feature exhibits what is known as "symmetric safety", where each processing member that views another member must also be viewed by that member. In this application, a member "viewing" another member means the first member has no reason to consider the second member, or communications with the second member, as having failed. Under symmetric safety, if two members views intersect in at least the name of one member with a view, then the two members views must be identical. A member's view always includes itself. Unfortunately, this ideal membership protocol is impossible in the presence of crash failures and lost messages.

One strategy for approximating an ideal membership protocol is to assume a high degree of synchrony in the computation and the transport layer of the processing elements. These are referred to as synchronous agreement protocols, such as the one described by Dwork et al. in U.S. Pat. No. 5,513,354. This patent concerns a method for managing tasks in a network of processors in which the processors exchange views as to which processors have failed and update their views based on the views received from the other processors. After a number of synchronous rounds of exchange, the operational processors reach an eventual agreement as to the status of the processors in the system. A failure in the assumed synchrony would lead to either inconsistency or the problem of "blocking". Also the agreement protocol is not designed to tolerate a communication partition.

Another strategy for approximating the ideal membership protocol is to weaken the requirement that the protocol terminate in a fixed amount of time, instead requiring that the protocol merely terminate eventually. This weaker membership protocol is referred to as an asynchronous agreement or consensus protocol, similar to the one described by T. Chandra et al. in *"The Weakest Failure Detector for Solving Consensus,"* Proceedings of the 11th Annual ACM Symposium on Principles of Distributed Computing, 1992, pp. 147–158. A disadvantage of such a consensus protocol is that there is no guarantee on how long the protocol requires to terminate. So, from a practical point of view, there is no guarantee of termination at all. Moreover, in the presence of communication failures (lost messages) that prevent one subgroup of participants from communicating with another subgroup, it is not even possible to guarantee eventual agreement.

Another approach, discussed in U.S. patent application Ser. No. 08/522,651, further weakens the membership conditions to require neither termination nor accuracy, and to reduce safety to merely require that, if the views of two members differed, then neither member was contained in the view of the other. Membership protocols satisfying these much weaker constraints are said to achieve interactive consistency, and referred to as interactive (or collective) consistency protocols. The advantage of interactive consistency protocols is that they usually terminate quickly and achieve both consistency and accuracy in the sense that a member's view of the current membership usually consists of the set of members with whom it could communicate. Their disadvantage is that there are no termination guarantees (i.e., they can not use a time-out), so a protocol might block forever waiting for a message that would never be sent from a member that has crashed.

Still another form of weakened membership protocols, referred to as dynamic uniformity, is described by D. Malki et al. in *"Uniform Actions in Asynchronous Distributed Systems,"* Proceedings of the 13th Annual ACM Symposium on Principles of Distributed Computing, 1994, pp. 274–283. Generally, dynamic uniformity requires that each correctly functioning participant either reaches the same decision as reached by any other participant or is eventually viewed as disabled by others. The main disadvantages with dynamic uniformity protocols are their complexity and possible temporary inconsistency.

Implementation of Known Multicast Techniques

Most conventional multicast systems employ a membership protocol providing symmetric safety. Some examples include: K. P. Birman and R. van Renesse, *Reliable Distributed Computing with the Isis Toolkit,* IEEE Computer Society Press, Los Alamitos, Calif., 1994; D. Dolev, D. Malki, and R. Strong "A Framework for Partitionable Membership Service", Technical Report TR94-6, Department of Computer Science, Hebrew University; F. Jahanian, S. Fakhouri, and R. Rajkumar, "Processor Group Membership Protocols: Specification, Design and Implementation" in *Proc. of 12th IEEE Symposium on Reliable Distributed Systems,* pp. 2–11, 1993; and R. van Renesse, K. P. Birman, and S. Maffeis, "Horus: A Flexible Group Communication System", *Comm. of the ACM,* vol. 39, no. 4, pp. 76–83, 1996.

Although some of these known multicast systems may have achieved some scientific recognition and even commercial activity, they may not be entirely adequate for certain applications or users. For instance, since they require symmetric or so-called "strict" safety, these systems are effectively "blocking".

Additionally, symmetric safety can be expensive from a processing standpoint, requiring many different inter-nodal messages to implement. Moreover, for some applications, symmetric safety can be undesirably slow and complex. Although symmetric safety has these known limitations, approaches using anything less than symmetric safety are considered undesirable because of the perception that they cannot meet the needs of application.

Consequently, known multicast systems are not completely adequate for some applications due to certain unsolved problems.

SUMMARY OF THE INVENTION

Broadly, the present invention concerns a method and apparatus to reliably deliver ordered machine-readable messages among processing members in a multiprocessing computer system, where failure conditions are addressed by invoking a membership protocol requiring only asymmetric safety in that whenever two members have different views as a result of the membership method, at least one regards the other as outside the current membership. The multiprocessing system includes multiple processing nodes, each having a unique source identifier ("source ID"). Each processing node has a membership view including one or more of the IDs of the processing nodes, with which it can nominally exchange messages.

Responsive to receipt of a stimulus message at a first processing node, the first node performs certain steps. For example, the first node increments a coordinated counter (CC). The first node also sends a multicast message to all processing nodes in the first node's membership group. The multicast message includes the received stimulus message, the incremented CC value, and the first node's source-ID. The first node further sets a timer, exclusively associated with the incremented CC value, to expire in a predetermined duration.

In contrast to the stimulus message, receipt of a multicast message at a first processing node, causes the node to perform a multicast input processing routine. The received multicast message includes a CC value. The node sets its CC equal to the maximum of its current CC value and the received multicast message's CC value. The node also sends an acknowledgement message to all processing nodes in the node's membership group. This message, for example, may include the received multicast message's CC value, the processing node's source-ID, and the received multicast message's source-ID. Also, in response to the multicast message, the first node sets a timer, exclusively associated with the received multicast message's CC value, to expire in a predetermined duration.

Whenever a node's timer associated with a CC value expires before that node receives confirming messages with the same CC value and source-ID from each of the node's membership group, the node invokes a membership protocol that provides asymmetric safety.

Accordingly, in one embodiment, the invention may be implemented to provide a method for communicating messages among multiple processing nodes in a multiprocessing system. In another embodiment, the invention may be implemented to provide an apparatus, such as a multiprocessing system, where messages are communicated among multiple processing nodes in the system. In still another embodiment, the invention may be implemented to provide a signal-bearing medium tangibly embodying a program of machine-readable instructions executable by a digital data processing apparatus to perform method steps for communicating messages among multiple processing nodes in a multiprocessing system.

The invention affords its users with a number of distinct advantages. Chiefly, the invention facilitates accurate, reliable communication among multiprocessing nodes in timely manner. Importantly, the invention provides a beneficial level of failure tolerance. Despite delayed messages, lost messages, failed processing nodes, and the like, each node avoids failure by accurately recognizing the failure condition, independently invoking a membership protocol, purging its queue of currently inapplicable messages, and continuing normal operations. Advantageously, as asymmetric membership protocol is used, it is non-blocking and wait-free. Also, compared to prior approaches, this technique is easier to implement, since it does not require a strong consensus and symmetry among group members. The invention also provides reliability, as message delivery is guaranteed for each properly operating member node in the multiprocessing system. The invention also provides a number of other advantages and benefits, which should be apparent from the following description of the invention.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein.

DETAILED DESCRIPTION OF THE PREFERRED EMBODIMENTS

Hardware Components & Interconnections

Multiprocessing System

Figure 1:
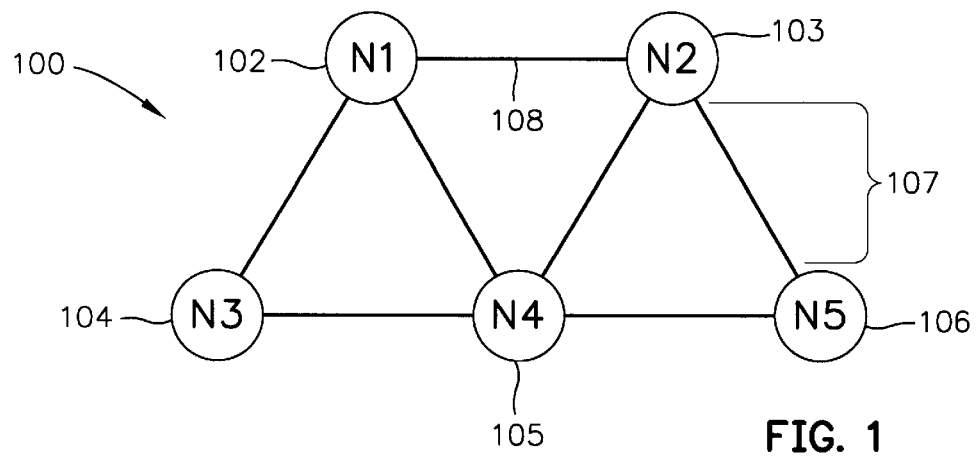
FIG. 1 is a block diagram of the hardware components and interconnections of a multiprocessing system in accordance with the invention.

One aspect of the present invention concerns a multiprocessing system, which may be embodied by various hardware components and interconnections as shown by the multiprocessing system 100 of FIG. 1. The system 100 includes a plurality of nodes 102–106, which may also be called "members", or "participants". The number of nodes shown is only an example, as no limitation is intended on the number of nodes. In an exemplary embodiment, each node may comprise a hardware component such as a personal computer, workstation, server, mainframe computer, microprocessor, or other digital data processing machine. These nodes 102–106 may be distributed, or not, depending upon the requirements of the particular application. Alternatively, the nodes 102–106 may comprise software modules, processes, threads, or another computer-implemented task.

The nodes 102–106 are interconnected by a communications network 107 comprising multiple paths such as the path 108. Where the nodes 102–106 have hardware-specific implementations, the communications network 107 may comprise a computer network such as an Ethernet network, or one or more computer channels, busses, cables, wires, electromagnetic or other wireless connections, fiber optic cables, or other suitable hardware interconnections. Where the nodes 102–106 are embodied by computer-implemented tasks, the network 107 may comprise virtual paths provided between different software-implemented nodes 102–106.

The multiprocessing system 100 may be especially useful in a number of different applications. For example, the nodes 102–106 may be used to exchange information in a banking network, automatic teller network, airlines reservation system, online transaction system, database management system, etc.

Exemplary Digital Data Processing Apparatus

Another aspect of the invention concerns a digital data processing apparatus, which may be provided to implement one or all of the nodes 102–106. This apparatus may be embodied by various hardware components and interconnections, and is preferably implemented in a digital data processing apparatus.

Figure 2:
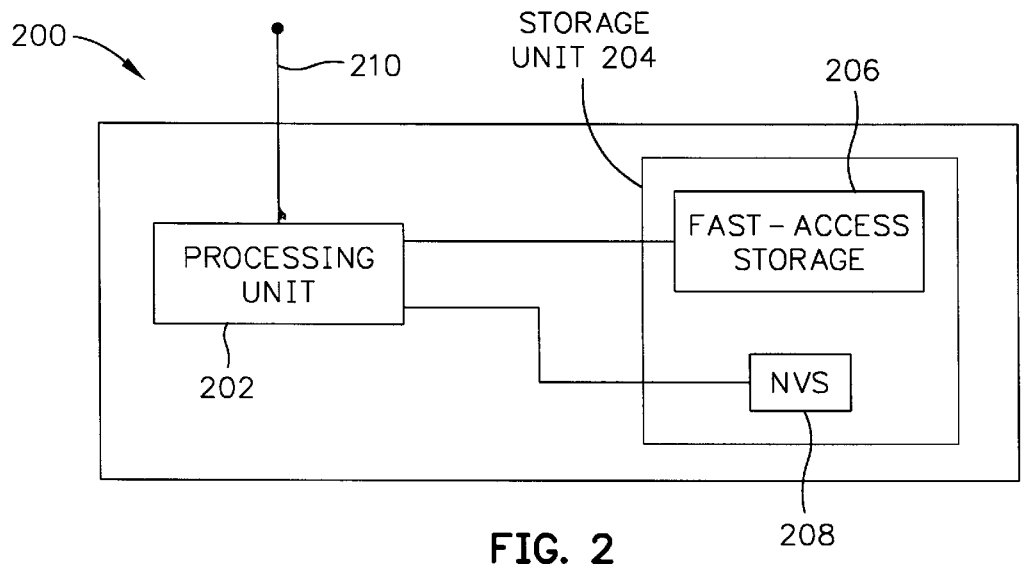
FIG. 2 is a block diagram of a digital data processing machine in accordance with the invention.

FIG. 2 shows an example of one such digital data processing apparatus 200. The apparatus 200 includes a processing unit 202, such as a microprocessor or other processing machine, coupled to a storage unit 204. In the present example, the storage unit 204 includes a fast-access memory 206 and nonvolatile storage 208. The fast-access memory 206 preferably comprises random access memory, and may be used to store the programming instructions executed by the processing unit 202 during such execution. The nonvolatile storage 208 may comprise, for example, one or more magnetic data storage disks such as a "hard drive", a tape drive, or any other suitable storage device. The apparatus 200 also includes an input/output 210, such as a line, bus, cable, electromagnetic link, or other means for exchanging data with the processing unit 202.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206/208 may be eliminated; furthermore, the storage unit 204 may be provided on-board the processing unit 202, or even provided externally to the apparatus 200.

OPERATION

In addition to the various hardware embodiments described above, a different aspect of the invention concerns a method to reliably deliver ordered machine-readable messages among processing members in a multiprocessing computer system, where failure conditions are addressed by invoking a membership protocol requiring only asymmetric safety.

Signal-Bearing Media

In the context of FIG. 1, such a method may be implemented, for example, by operating each node 102–106, embodied by one or more digital data processing apparatuses 200, to execute corresponding sequences of machine-readable instructions. These instructions may reside in various types of signal-bearing media. In this respect, one aspect of the present invention concerns a programmed product, comprising signal-bearing media tangibly embodying a program of machine-readable instructions executable by a digital data processor to perform a method to performing ordered reliable multicast with asymmetric safety in a multiprocessing system.

Figure 3:
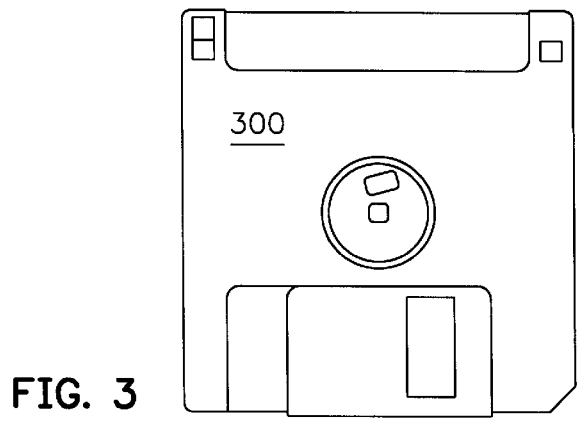
FIG. 3 shows an exemplary signal-bearing medium in accordance with the invention.

This signal-bearing media may comprise, for example, RAM (not shown) contained within each node 102–106, as represented by the storage unit 204 of the digital data processing apparatus 200, for example. Alternatively, the instructions may be contained in another signal-bearing media, such as a magnetic data storage diskette 300 (FIG. 3), directly or indirectly accessible by the processing unit 202 of the digital data processing apparatus 200. Whether contained in the diskette 300, storage unit 204, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape), paper "punch" cards, or other suitable signal-bearing media including transmission media such as digital and analog and communication links and wireless. In an illustrative embodiment of the invention, the machine-readable instructions may comprise compiled software code from a language such as C.

Overall Operation

Sequence

Figure 4:
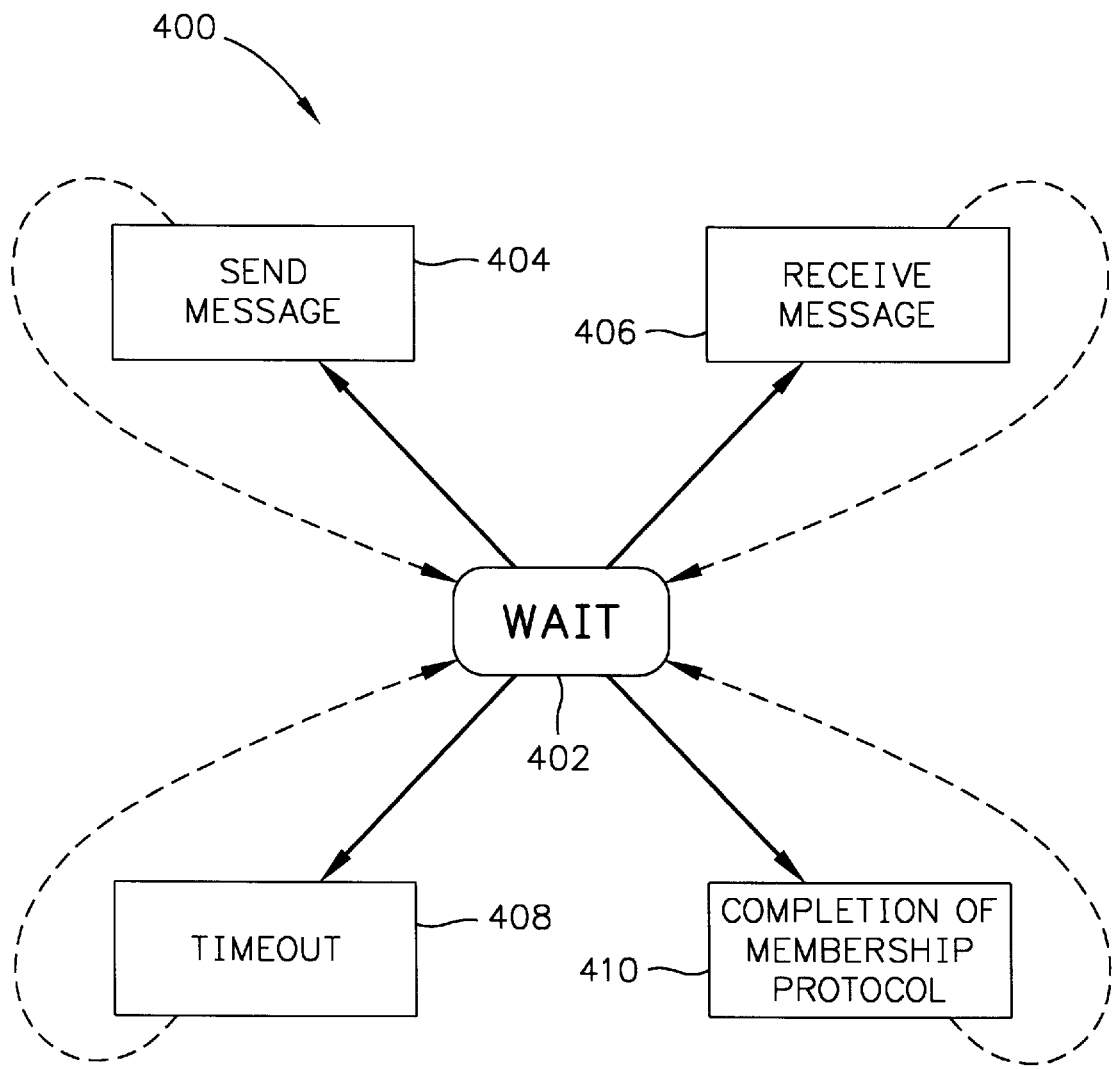
FIG. 4 is a flowchart showing an illustrative operational sequence for ordered reliable multicast with asymmetric safety in a multiprocessing system.

FIG. 4 shows an operational sequence or "routine" 400 of method steps to illustrate one example of the method aspect of the present invention. For ease of explanation, but without any limitation intended thereby, the example of FIG. 4 is described in the context of the multiprocessing system 100 described above. The routine 400 is performed independently by each of the nodes 102–106. For illustration, the routine 400 is described below in the context of the node 102. In one example, where the nodes 102–106 comprise hardware devices such as the apparatus 200 (FIG. 2), each node preferably performs the routine 400 by executing appropriate programming instructions with its processing unit 202. In the illustrated embodiment, the node 102 performs the routine 400 perpetually unless it is interrupted by being powered down, or by a hardware or software failure.

In the absence of other activity, the node 102 resides in a wait state in step 402. When any number of different conditions occurs, the node 102 exists the wait state 402 to perform one of the sub-tasks 404–410. Generally, the steps 404–410 concern the sending, receiving, and processing of messages between the nodes 102–106.

Accordingly, the sub-task 404 concerns the initiation of an inter-nodal message. In the preferred embodiment, the node 102 initiates sending of a message under direction of a remotely running application program (not shown). The node's generation and sending of an inter-nodal message in step 404 may occur in response to receipt of an appropriate instruction from the application program. This instruction is referred to as a "stimulus" message. After sending its message in response to the stimulus message step 404, the node 102 returns to the wait state 402.

The sub-task 406 is performed when the node 102 receives an inter-nodal message from another node 103–106. As explained below, this step involves certain evaluation and processing of the received message.

As explained below, each message is associated with a coordinated counter (CC). Also, a timer is associated with each different CC value. The sub-task 408 is performed whenever a timer expires for a certain CC value. If a message has not completed before expiration of its prescribed timer, a membership protocol is invoked. This is explained in greater detail below.

The sub-task 410 is performed upon completion of a membership protocol. This step involves the reconsideration of pending messages in view of the newly established membership.

Implementation Details

In the preferred embodiment of the invention, the routine 400 is implemented with a number of specific organizational features. These features are listed below.

Coordinated Counter (CC)

Each node maintains a CC, which is incremented when that node sends messages out. Under some circumstances, however, the CC is synchronized with other counters.

As explained below, a node includes its counter value in any messages sent by that node. The counter is preferably numeric, although alphabetic, alphanumeric, or other suitable counting schemes may be used. Preferably, the counter comprises a bounded counter, that wraps around upon reaching its maximum value. Namely, as discussed below, CC values expire after a bounded amount of time after which they are no longer used in the system. Thus, the CC can wrap around, providing it contains sufficiently many values so that no old message could arrive very late and mistakenly appear to be a new message.

When a node receives a message, the node advances its CC past the CC of the received message, ensuring a fresh CC value. Thus, although each CC is incremented independently of the others, it is coordinated to prevent falling behind the CCs of incoming messages.

Timer

Each time a node sends a message, it sets a timer associated with that message. In the illustrated embodiment, the timer is associated with a particular message by association with the message's CC value. The timer may be a predefined, universal timeout value, or it may vary individually according to the circumstances under which the timer is set. As a specific example, the predefined timeout value may be connected to a time-of-day clock value and stored in a scheduler data structure, to be processed after the specified time has passed. Such processing may comprise setting of an interrupt pointing to code and data previously specified when the timer originally set.

Source-ID

Each node has an identification (ID) code, comprising numeric, alphabetic, alphanumeric, or other code that is unique in comparison to other nodes' source-IDs. As explained below, a node includes its source-ID in any messages sent by that node.

Queue

Each node maintains a queue, for storage of messages to be processed by that node. When a node removes a message from its queue for processing, that message is said to be "delivered". Preferably, as shown in greater detail below, data in each node's queue is arranged in CC order.

Send Message

Figure 5:
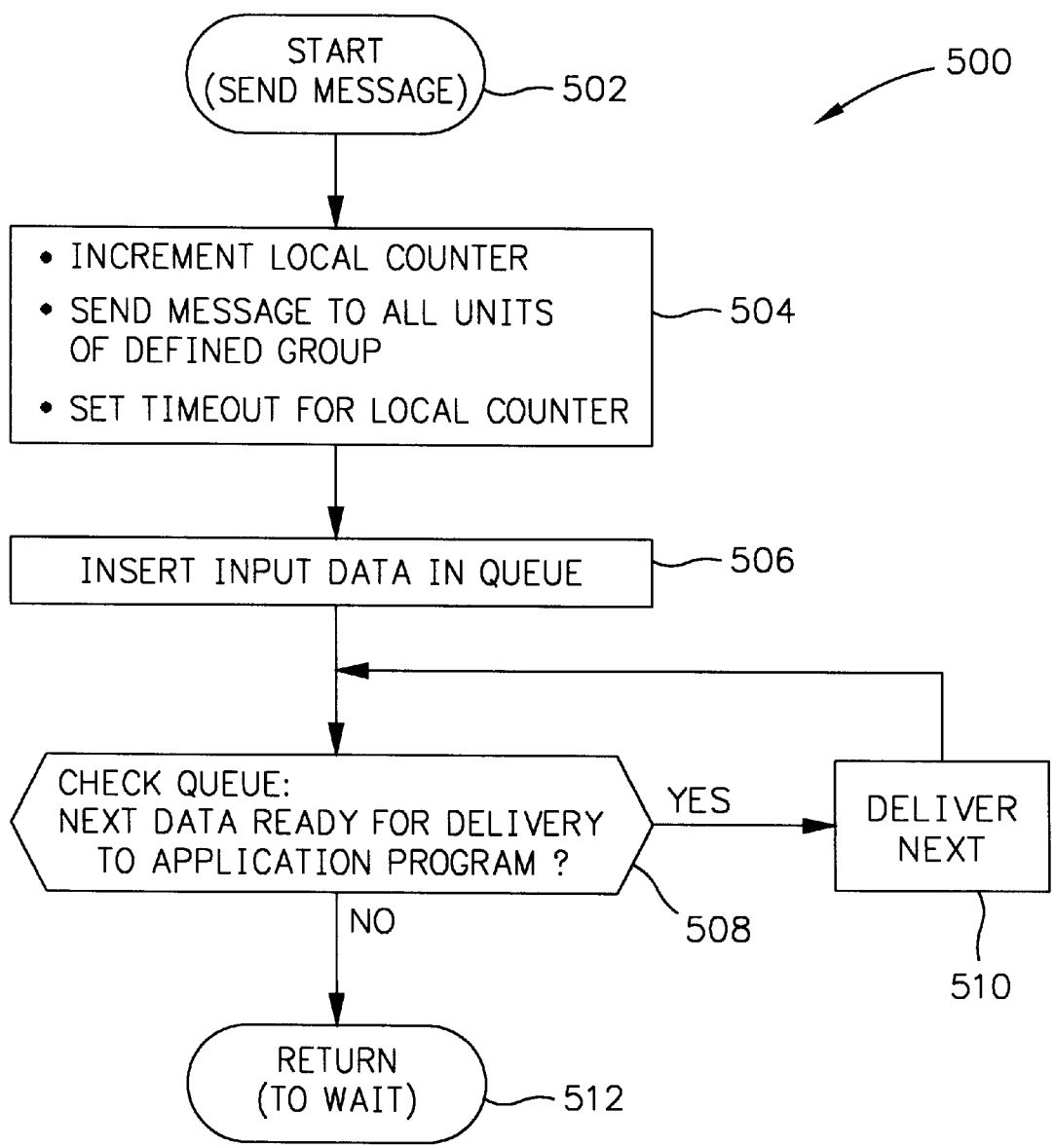
FIG. 5 is a flowchart of an operational sequence for message sending, for use in implementing ordered reliable multicast with asymmetric safety in a multiprocessing system.

FIG. 5 shows a sequence 500 to illustrate one example of the "send message" sub-task 404. For ease of explanation, but without any limitation intended thereby, the example of FIG. 5 is described in the context of the multiprocessing system 100 described above. And, although the sequence 500 is performed independently by each of the nodes 102–106, it is described below in the context of the node 102. In one example, where the nodes 102–106 comprise hardware devices such as the apparatus 200 (FIG. 2), each node preferably performs the sequence 500 by executing appropriate programming instructions with its processing unit 202.

The sequence 500 is initiated in step 502, when the node 102 receives a "stimulus" message from an application program. This application program may be running at the node 102, another node 103–106, or at another processing device elsewhere. The stimulus message directs the node 102 to engage its perceived membership "group" of nodes to cooperatively perform some task. The membership group may comprise some or all of the nodes 102–106, each of these nodes being "viewed" by the node 102. In other words, the membership group of the node 102 includes all nodes for which communication with the node 102 has not failed or been otherwise disabled.

In response to step 502, the node 102 performs step 504, in which it increments its CC. As an example, the CC may be incremented as shown in Equation 1:

$$CC=CC+1 \quad [1]$$

where:

CC: is a variable representing the coordinated counter.
Also in step 504, the node 102 sends a message to all nodes in its membership group. This message may have the format of Equation 2, shown below.

$$message=<message\ type,\ CC,\ source\text{-}ID,\ body> \quad [2]$$

where:

message type is the type of message, e.g. membership protocol invoking message, multicast message, or acknowledgement.

CC is a variable representing the coordinated counter.

source-ID is the source-ID of the sending node 102.

body is the content of the message.

In the case of an acknowledgement, the body preferably consists of the source-ID of the message being acknowledged, the CC value of the acknowledging node's CC, and the source-ID is the acknowledging node's source-ID. If the message is a multicast, the CC is the value of sending the node's CC, and the source-ID is the node 102's source-ID.

Also in step 504, the node 102 sets a timer specific to the current CC. As a specific example, the timer may be set to a predetermined value, such as a time between ten milliseconds and two seconds. After step 504, the node 102 in step 506 inserts the body of the message into the node 102's queue, assuming the node 102 is a member of the group prescribed by the message sent in step 504. The node 102 inserts the data entry into the queue 506 in order of its CC, with respect to other data entries in the queue.

After step 506, the node 102 in step 508 determines whether the first entry in its queue constitutes data ready for delivery to the application program. A data entry is ready for delivery to the application program if the following conditions exist:

1. The data entry is first in the queue (ordered by CC value and then by source-ID);
2. Messages confirming the associated CC value and source-ID have been received from all nodes in the membership group of the node 102;
3. There is no membership protocol in progress; and
4. Either the node 102 delivered at least one data entry with the preceding CC value or a membership protocol with the same CC value as that of the data entry has completed.

If a data entry is ready for delivery, the node 102 provides the data to the application program in step 510. Namely, in step 510 the data, comprising the body of a multicast message, is delivered by sending it to the application program. After 510, control returns to step 508. When step 508 finds no data ready for delivery, the sequence 500 ends in step 512, returning to the wait state 402 (FIG. 4).

Receive Message

Figure 6:
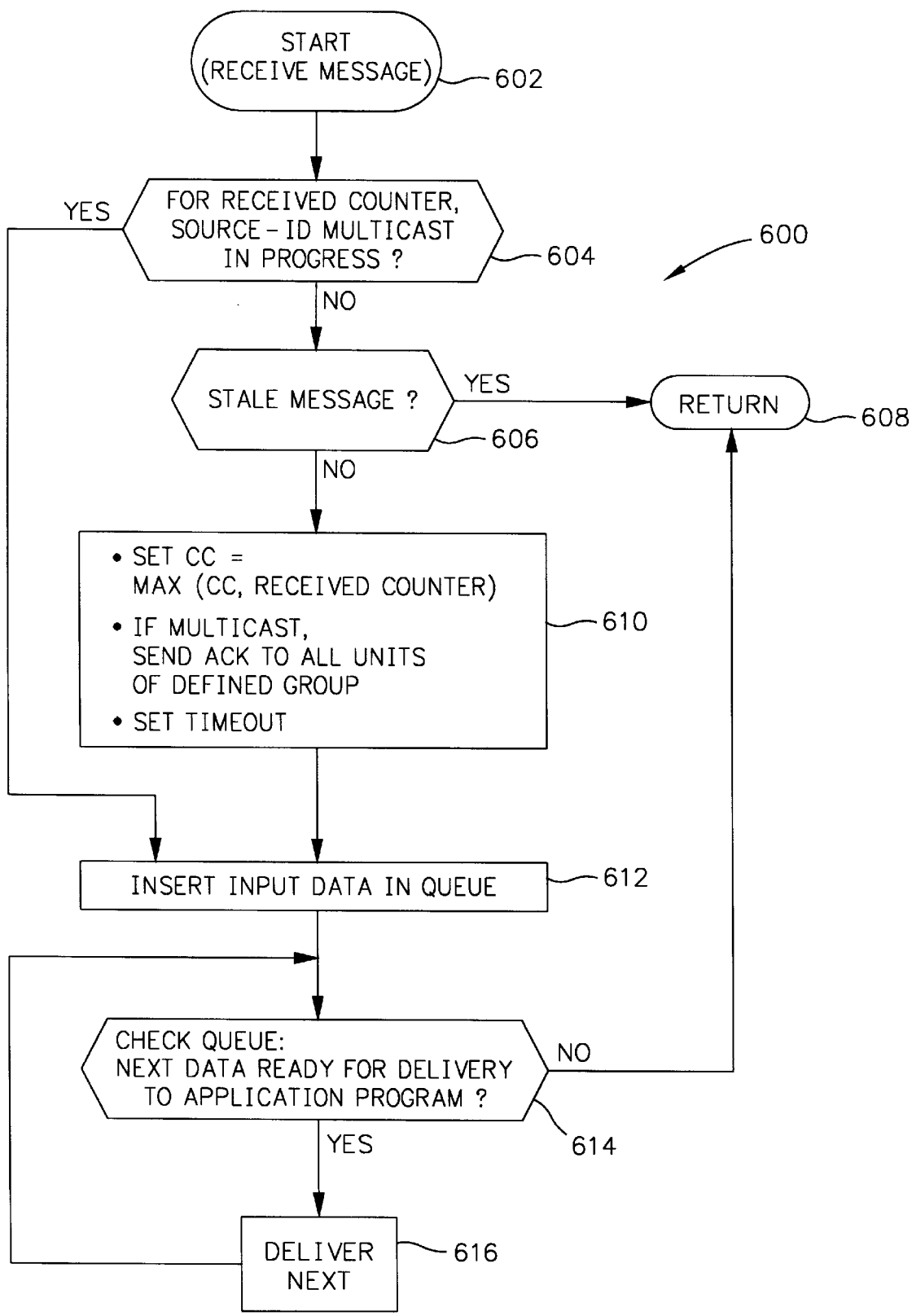
FIG. 6 is a flowchart of an operational sequence for message receiving, for use in implementing ordered reliable multicast with asymmetric safety in a multiprocessing system.

FIG. 6 shows a sequence 600 to illustrate one example of the "receive message" sub-task 406. For ease of explanation, but without any limitation intended thereby, the example of FIG. 6 is described in the context of the multiprocessing system 100 described above. And, although the sequence 600 is performed independently by each of the nodes 102–106, it is described below in the context of the node 102. In one example, where the nodes 102–106 comprise hardware devices such as the apparatus 200 (FIG. 2), each node preferably performs the sequence 600 by executing appropriate programming instructions with its processing unit 202.

The sequence 600 is initiated in step 602, when the node 102 receives a multicast or acknowledgement message from another one of the nodes 102–106 in the node 102's membership group. This message is different than a "stimulus" message, which is received from an application program to initiate a task to be performed cooperatively by all nodes in the node 102's membership group. The message received in step 602 may be a response to an earlier message sent by the node 102, a message another node sends when that node receives a stimulus messages, etc.

The received message has the same format shown above in Equation 2. Step 604 determines whether a multicast operation is already in progress for the received CC value and source-ID. This determination is made by finding whether the node 102 has any received multicast messages with this CC and source-ID, but not yet delivered. More particularly, the node 102 makes this determination by scanning its queue, which contains undelivered messages, for messages with the received CC and source-ID. If a multicast operation is already in progress for the CC value and source-ID confirmed by the message received in step 602, the node 102 proceeds to steps 612, 614, and 616.

If the message type of the received message is multicast, then step 612 substantially replicates step 506 discussed above. If the message type of the received message is acknowledgement, then in step 612, the data entry in the queue for the CC value and source-ID confirmed by the received message is updated to show that a confirming message has been received from the member with the same ID as the source-ID of the received message. Steps 614 and 616 substantially replicate steps 508 and 510 discussed above.

Otherwise, if step 604 finds no multicast operation in progress for the received CC, step 606 asks whether the message is "stale". A stale message is one that has a CC corresponding to a message that has already been "delivered". The node 102 can determine whether the received message is stale by consulting its queue; in particular, if the received message's CC is earlier than the oldest message in the queue, the received message is stale. If the message is stale, the routine ends in step 608, then returning to the wait state 402 (FIG. 4).

On the other hand, if step 606 finds that the message is not stale, step 610 is performed. In step 610, the node 102 sets its CC equal to the maximum of its current value and the received CC. This is performed to ensure that the node's future messages will have a fresh CC, not to be deemed stale by other nodes that receive messages with that CC. In this respect, the node's CC is "coordinated" with all other nodes in the system 100. Also in step 610, if the message type is multicast the node 102 sends an acknowledgement message to all nodes in the node 102's membership group. The acknowledgement message includes a message type (i.e., acknowledge), CC, and source-ID, and its body contains the source-ID of the received multicast message being acknowledged, as discussed above.

Step 610 further sets a timer specific to the current CC. After step 610, the routine 600 proceeds to steps 612, 614 and 616, which execute as previously discussed above.

Timeout Processing

Figure 7:
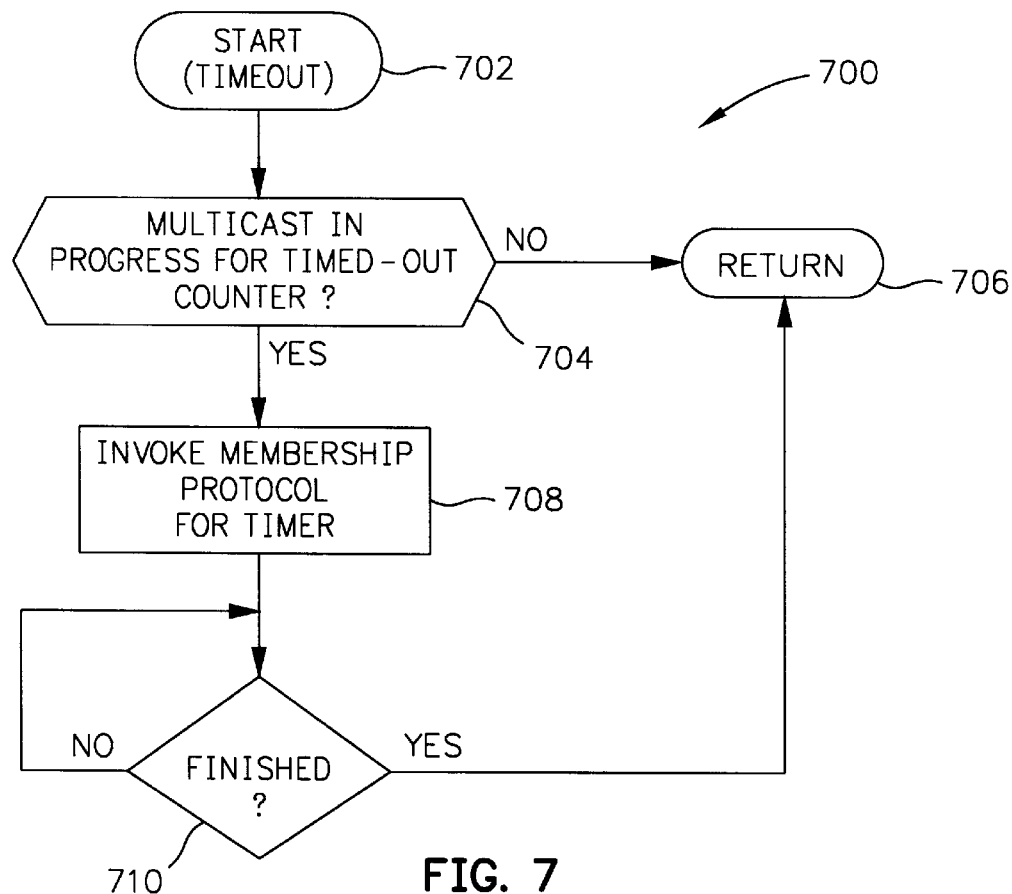
FIG. 7 is a flowchart of an operational sequence for timeout processing, for use in implementing ordered reliable multicast with asymmetric safety in a multiprocessing system.

FIG. 7 shows a sequence 700 to illustrate one example of the "timeout" sub-task 408. For ease of explanation, but without any limitation intended thereby, the example of FIG. 7 is described in the context of the multiprocessing system 100 described above. And, although the sequence 700 is performed independently by each of the nodes 102–106, it is described below in the context of the node 102. In one example, where the nodes 102–106 comprise hardware devices such as the apparatus 200 (FIG. 2), each node preferably performs the sequence 700 by executing appropriate programming instructions with its processing unit 202.

The sequence 700 is initiated in step 702, when the node 102 experiences an expiration of a timer. As mentioned above, each timer is specifically associated with a CC value to identify a failed message associated with the timeout condition. After step 702, the node 102 in step 704 asks whether a multicast was in progress for the timed-out CC. This is determined by scanning the queue for any messages with the timed-out CC; if any such messages are found in the queue, a multicast was in fact ongoing for the timed-out CC. If no multicast operation was ongoing, the routine 700 ends in step 706, returning to the wait state 402.

Otherwise, if an uncompleted multicast operation was timed-out, the node 102 in step 708 invokes a membership protocol before delivering the timed-out message or any messages with subsequent CCs. The membership protocol is triggered by sending a membership protocol request message to each node in the node 102's membership group; this message includes the node 102's current membership view and the value of the timed-out CC. During the membership protocol, the nodes 102–106 exchange view and establish new membership groups.

In other words, by invoking the membership protocol, the node 102 causes all of the nodes 102–106 to cooperatively coordinate membership views, guaranteeing at least asymmetric safety. This may be performed, for example, as described in co-pending application "Method for Coordinating Membership with Asymmetric Safety in a Distributed System", issued as U.S. Pat. No. 5,923,831 referenced above and incorporated herein by reference.

Figure 9:
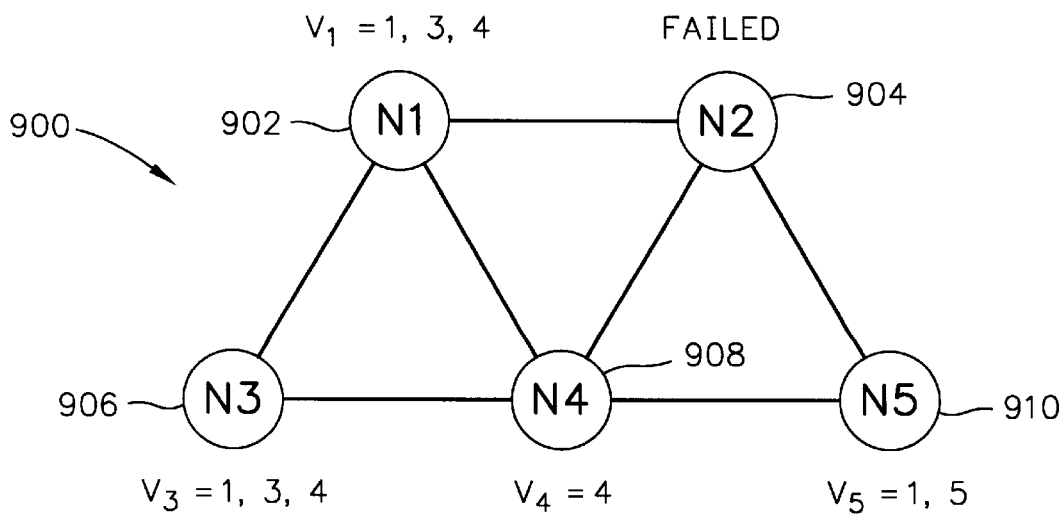
FIG. 9 is a block diagram of the hardware components and interconnections of a multiprocessing system demonstrating an example of asymmetric safety in accordance with the invention.

As mentioned above, the requested membership protocol only requires asymmetric safety. Thus, one node that "views" another node need not enjoy a reciprocal view. FIG. 9 depicts a specific example of a multiprocessing system 900 with asymmetric safety. In this example, the nodes 902 (N1) and 906 (N3) share a view including themselves and the node 908 (N4). The node 908 (N4), however, does not share this view, its view including only itself The node 904 (N2) has failed. The membership group of the node 910 (N5) includes itself and the node 902 (N1), a view not shared by the node 902 (N1).

After invoking the membership protocol with asymmetric safety in step 708, step 710 repeats until the membership protocol finishes when this occurs, the routine 700 ends in step 706.

Post-Membership Protocol

Figure 8:
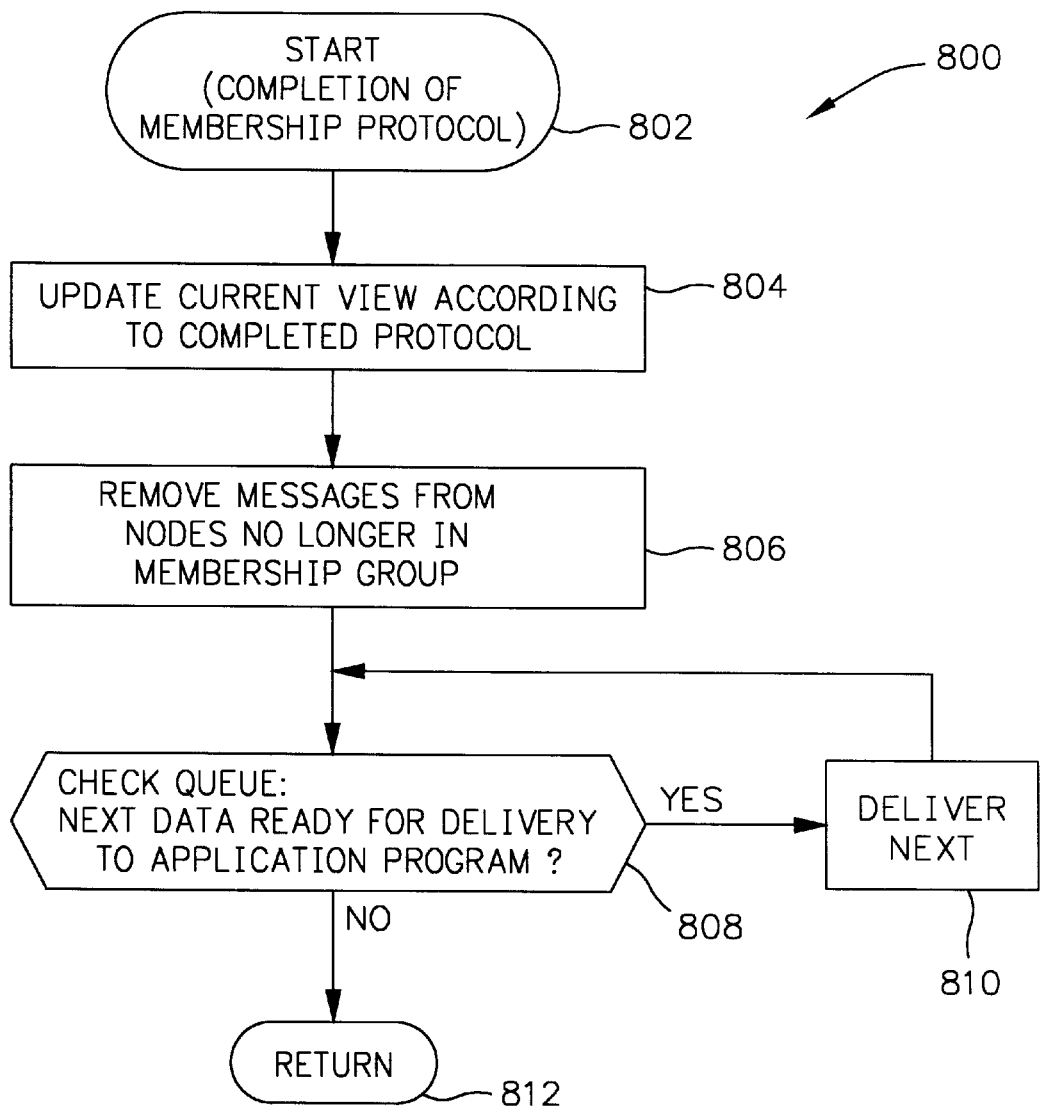
FIG. 8 is a flowchart of an operational sequence for post-membership protocol processing, for use in implementing ordered reliable multicast with asymmetric safety in a multiprocessing system.

FIG. 8 shows a sequence 800 to illustrate one example of the "completion of membership protocol" sub-task 410. For ease of explanation, but without any limitation intended thereby, the example of FIG. 8 is described in the context of the multiprocessing system 100 described above. And, although the sequence 800 is performed independently by each of the nodes 102–106, it is described below in the context of the node 102. In one example, where the nodes 102–106 comprise hardware devices such as the apparatus 200 (FIG. 2), each node preferably performs the sequence 800 by executing appropriate programming instructions with its processing unit 202.

The sequence 800 is initiated in step 802, when the node 102 learns of completion of a requested membership protocol. In step 804, the node 102 updates its current view ("membership group") according to the just-completed membership protocol. Then, in step 806, the node 102 filters its queue, purging any data entries from any nodes absent from the node 102's newly established membership group. After step 806, step 808 checks the contents of the node 102's queue for data ready for delivery to the application program. Step 808 is substantially the same as step 508 discussed above, except that, if the first data entry in the queue is still not ready for delivery after a membership protocol for the associated CC value, then the data entry is discarded. If a data entry is ready for delivery (as in step 508) the node 102 sends the data in step 810, which substantially replicates step 510. After step 810, control returns to step 808.

When step 808 finds no data ready for delivery, the sequence 800 ends in step 812, returning to the wait state 402 (FIG. 4).

OTHER EMBODIMENTS

While there have been shown what are presently considered to be preferred embodiments of the invention, it will be apparent to those skilled in the art that various changes and modifications can be made herein without departing from the scope of the invention as defined by the appended claims.

What is claimed is:

1. A method of communicating messages among multiple processing nodes in a multiprocessing system, comprising:

a first one of the nodes initiating transmission of a message to a predetermined group of the nodes;

one node in the predetermined group receiving notification of the initiated message transmission;

said one node detecting a failure condition by failing to receive acknowledging communications from all other nodes in the predetermined group during a predetermined time period; and in response to detection of the failure condition, said one node invoking a membership protocol providing asymmetric safety.

2. The method of claim 1, where:

the predetermined group of nodes includes the first node, said one node is the first node, and said notification comprises the first node receiving the initiated transmission.

3. The method of claim 1, said one node being different than the first node, said notification comprising said one node receiving the initiated transmission.

4. The method of claim 1, the predetermined time period extending a predetermined amount of time from the receipt of notification.

5. The method of claim 1, where the predetermined group of nodes includes all of the processing nodes in the multiprocessing system.

6. The method of claim 1, the acknowledging communications from each other node comprising a message responsive to the initiated transmission.

7. A method for communicating messages among multiple processing nodes in a multiprocessing system, each processing node having a coordinated counter (CC) and a unique source-ID, each processing node having a membership view including one or more of the processing nodes, the method comprising:

responsive to receipt of a stimulus message at any one of the processing nodes, said stimulus receiving processing node:

incrementing a CC of the stimulus receiving processing node to an incremented value;

sending a multicast message to all processing nodes in said stimulus receiving processing node's membership view, the multicast message including the received stimulus message, the incremented CC value, and the stimulus receiving processing node's source-ID; and setting a timer to expire in a predetermined duration, the timer being exclusively associated with the incremented CC value;

responsive to receipt of a multicast message at any one of the processing nodes, the received multicast message including a CC value, the multicast receiving processing node performing a multicast input processing routine comprising:

setting said multicast receiving processing node's CC to the received multicast message's CC value if greater than a current CC value of the multicast receiving processing node;

sending an acknowledgement message to all nodes in the multicast receiving processing node's membership view; and setting a timer to expire in a predetermined duration, the timer being exclusively associated with the received multicast message's CC value; and responsive to a node's timer associated with a CC value expiring before satisfaction of a predetermined delivery condition for a received multicast message having the associated CC value, the node invoking a membership protocol providing asymmetric safety.

8. The method of claim 7, the predetermined delivery condition comprising the node's receipt of messages with the same CC value from each of the node's membership view.

9. The method of claim 7, the predetermined delivery condition comprising satisfaction of the following conditions:

the received multicast message being first in order among all messages received by the multicast receiving processing node, when the received messages are ordered by CC value and then source-ID; and messages confirming the associated CC value and source-ID having been received from all nodes in the membership group of the multicast receiving processing node; and no membership protocol being in progress; and either (1) the multicast receiving processing node having delivered at least one message having the CC value of the received multicast message, or (2) a membership protocol having been completed responsive to expiration of a timer associated with the received multicast message's CC value.

10. The method of claim 7, the acknowledgement message including the received multicast message's CC value and source-ID, the multicast receiving processing node's source-ID, and the source-ID of the received multicast message.

11. The method of claim 7, the processing nodes comprising digital data processing apparatuses.

12. The method of claim 7, the processing nodes comprising software processes.

13. The method of claim 7, the multicast input processing routine comprising:

determining whether a multicast message having the CC value of the received multicast message has been previously received by the multicast receiving processing node;

if so, determining whether the multicast receiving processing node has already processed the received multicast message, and if not, scheduling the received multicast message for subsequent processing by the multicast receiving processing node;

if not, performing steps comprising:

setting the multicast receiving processing node's CC to the received multicast message's CC value;

sending an acknowledgement message to all processing nodes in said multicast receiving processing node's membership view; and setting a timer to expire in a predetermined duration, the timer being exclusively associated with the received multicast message's CC value.

14. The method of claim 13, the acknowledgement message including the received multicast message's CC value and source-ID, the multicast receiving processing node's source-ID, and the source-ID of the received multicast message.

15. The method of claim 13, the scheduling of the received multicast message for subsequent processing by the multicast receiving processing node comprising:

inserting the received multicast message into a queue.

16. The method of claim 7, the method further comprising:

each processing node maintaining a queue containing received messages for processing by that processing node, the messages being ordered according to their CCs.

17. The method of claim 16, the messages being secondarily ordered according to source-IDs.

18. The method of claim 16, the method further comprising:
each processing node repeatedly processing messages from its queue until the queue is empty.

19. The method of claim 16, where, further responsive to receipt of a stimulus message at any one of the processing nodes, the stimulus receiving processing node inserts the stimulus message into the stimulus receiving processing node's queue.

20. The method of claim 7, wherein:
each processing node maintains a queue containing received messages for processing by the processing node;
responsive to completion of a membership protocol, each processing node performs steps comprising:
updating the processing node's membership view in accordance with the completed membership protocol;
purging the processing node's queue of messages from any processing nodes absent from the processing node's updated membership view.

21. A signal-bearing medium tangibly embodying a program of machine-readable instructions executable by a digital processing apparatus to perform a method for communicating messages among multiple processing nodes in a multiprocessing system, said method comprising:
a first one of the nodes initiating transmission of a message to a predetermined group of the nodes;
one node in the predetermined group receiving notification of the initiated message transmission;
said one node detecting a failure condition by failing to receive acknowledging communications from all other nodes in the predetermined group during a predetermined time period; and
in response to detection of the failure condition, said one node invoking a membership protocol providing asymmetric safety.

22. The medium of claim 21, where:
the predetermined group of nodes includes the first node, said one node is the first node, and said notification comprises the first node receiving the initiated transmission.

23. The medium of claim 21, said one node being different than the first node, said notification comprising said one node receiving the initiated transmission.

24. The medium of claim 21, the predetermined time period extending a predetermined amount of time from the receipt of notification.

25. The medium of claim 21, where the predetermined group of nodes includes all of the processing nodes in the multiprocessing system.

26. The medium of claim 21, the acknowledging communications from each other node comprising a message responsive to the initiated transmission.

27. A signal-bearing medium tangibly embodying a program of machine-readable instructions executable by a digital processing apparatus to perform a method for communicating messages among multiple processing nodes in a multiprocessing system, each processing node having a unique source-ID, each processing node having a membership view including one or more of the processing nodes, said method comprising:
responsive to receipt of a stimulus message at any one of the processing nodes, said stimulus receiving processing node:
incrementing a CC of the stimulus receiving processing node to an incremented value;
sending a multicast message to all processing nodes in said stimulus receiving processing node's membership view, the multicast message including the received stimulus message, the incremented CC value, and the stimulus receiving processing node's source-ID; and
setting a timer to expire in a predetermined duration, the timer being exclusively associated with the incremented CC value;
responsive to receipt of a multicast message at any one of the processing nodes, the received multicast message including a CC value, the multicast receiving processing node performing a multicast input processing routine comprising:
setting said multicast receiving processing node's CC to the received multicast message's CC value if greater than a current CC value of the multicast receiving processing node;
sending an acknowledgement message to all nodes in the multicast receiving processing node's membership view; and
setting a timer to expire in a predetermined duration, the timer being exclusively associated with the received multicast message's CC value; and
responsive to a node's timer associated with a CC value expiring before satisfaction of a predetermined delivery condition for a received multicast message having the associated CC value, the node invoking a membership protocol providing asymmetric safety.

28. The signal-bearing medium of claim 27, the predetermined delivery condition comprising the node's receipt of messages with the same CC value from each of the node's membership view.

29. The signal-bearing medium of claim 27, the predetermined delivery condition comprising satisfaction of the following conditions:
the received multicast message being first in order among all messages received by the multicast receiving processing node, when the received messages are ordered by CC value and then source-ID; and
messages confirming the associated CC value and source-ID having been received from all nodes in the membership group of the multicast receiving processing node; and
no membership protocol being in progress; and
either (1) the multicast receiving processing node having delivered at least one message having the CC value of the received multicast message, or (2) a membership protocol having been completed responsive to expiration of a timer associated with the received multicast message's CC value.

30. The signal-bearing medium of claim 27, the acknowledgement message including the received multicast message's CC value and source-ID, the multicast receiving processing node's source-ID, and the source-ID of the received multicast message.

31. The signal-bearing medium of claim 27, the processing nodes comprising digital data processing apparatuses.

32. The signal-bearing medium of claim 27, the processing nodes comprising software processes.

33. The signal-bearing medium of claim 27, the multicast input processing routine comprising:
determining whether a multicast message having the CC value of the received multicast message has been previously received by the multicast receiving processing node;

if so, determining whether the multicast receiving processing node has already processed the received multicast message, and if not, scheduling the received multicast message for subsequent processing by the multicast receiving processing node;

if not, performing steps comprising:
setting the multicast receiving processing node's CC to the received multicast message's CC value;
sending an acknowledgement message to all processing nodes in said multicast receiving processing node's membership view; and
setting a timer to expire in a predetermined duration, the timer being exclusively associated with the received multicast message's CC value.

34. The signal-bearing medium of claim 33, the acknowledgement message including the received multicast message's CC value and source-ID, the multicast receiving processing node's source-ID, and the source-ID of the received multicast message.

35. The signal-bearing medium of claim 33, the scheduling of the received multicast message for subsequent processing by the multicast receiving processing node comprising:
inserting the received multicast message into a queue.

36. The signal-bearing medium of claim 27, the method further comprising:
each processing node maintaining a queue containing received messages for processing by that processing node, the messages being ordered according to their CCs.

37. The signal-bearing medium of claim 36, the messages being secondarily ordered according to source-IDs.

38. The signal-bearing medium of claim 36, the method further comprising: each processing node repeatedly processing messages from its queue until the queue is empty.

39. The signal-bearing medium of claim 36, where, further responsive to receipt of a stimulus message at any one of the processing nodes, the stimulus receiving processing node inserts the stimulus message into the stimulus receiving processing node's queue.

40. The signal-bearing medium of claim 27, wherein:
each processing node maintains a queue containing received messages for processing by the processing node;
responsive to completion of a membership protocol, each processing node performs steps comprising:
updating the processing node's membership view in accordance with the completed membership protocol;
purging the processing node's queue of messages from any processing nodes absent from the processing node's updated membership view.

41. A multiprocessing system, comprising:
multiple processing nodes; and
a communications network interconnecting the nodes;
wherein each node is programmed to perform a method for communicating messages among the processing nodes, said method comprising:
a first one of the nodes initiating transmission of a message to a predetermined group of the nodes;
one node in the predetermined group receiving notification of the initiated message transmission;
said one node detecting a failure condition by failing to receive acknowledging communications from all other nodes in the predetermined group during a predetermined time period; and
in response to detection of the failure condition, said one node invoking a membership protocol providing asymmetric safety.

42. The system of claim 41, where:
the predetermined group of nodes includes the first node, said one node is the first node, and said notification comprises the first node receiving the initiated transmission.

43. The system of claim 41, said one node being different than the first node, said notification comprising said one node receiving the initiated transmission.

44. The system of claim 41, the predetermined time period extending a predetermined amount of time from the receipt of notification.

45. The system of claim 41, where the predetermined group of nodes includes all of the processing nodes in the multiprocessing system.

46. The system of claim 41, the acknowledging communications from each other node comprising a message responsive to the initiated transmission.

47. A multiprocessing apparatus, comprising:
multiple processing nodes, each processing node having a unique source-ID and a membership view including one or more of the processing nodes; and
a communications network interconnecting the nodes;
wherein each node is programmed to perform a method for communicating messages among the processing nodes, said method comprising:
responsive to receipt of a stimulus message at any one of the processing nodes, said stimulus receiving processing node:
incrementing a CC of the stimulus receiving processing node to an incremented value;
sending a multicast message to all processing nodes in said stimulus receiving processing node's membership view, the multicast message including the received stimulus message, the incremented CC value, and the stimulus receiving processing node's source-ID; and
setting a timer to expire in a predetermined duration, the timer being exclusively associated with the incremented CC value;
responsive to receipt of a multicast message at any one of the processing nodes, the received multicast message including a CC value, the multicast receiving processing node performing a multicast input processing routine comprising:
setting said multicast receiving processing node's CC to the received multicast message's CC value if greater than a current CC value of the multicast receiving processing node;
sending an acknowledgement message to all nodes in the multicast receiving processing node's membership view; and
setting a timer to expire in a predetermined duration, the timer being exclusively associated with the received multicast message's CC value; and
responsive to a node's timer associated with a CC value expiring before satisfaction of a predetermined delivery condition for a received multicast message having the associated CC value, the node invoking a membership protocol providing asymmetric safety.

48. The apparatus of claim 47, the predetermined delivery condition comprising the node's receipt of messages with the same CC value from each of the node's membership view.

49. The apparatus of claim 47, the predetermined delivery condition comprising satisfaction of the following conditions:

the received multicast message being first in order among all messages received by the multicast receiving processing node, when the received messages are ordered by CC value and then source-ID; and messages confirming the associated CC value and source-ID having been received from all nodes in the membership group of the multicast receiving processing node; and no membership protocol being in progress; and either (1) the multicast receiving processing node having delivered at least one message having the CC value of the received multicast message, or (2) a membership protocol having been completed responsive to expiration of a timer associated with the received multicast message's CC value.

50. The apparatus of claim 47, the acknowledgement message including the received multicast message's CC value and source-ID, the multicast receiving processing node's source-ID, and the source-ID of the received multicast message.

51. The apparatus of claim 47, the processing nodes comprising digital data processing apparatuses.

52. The apparatus of claim 47, the processing nodes comprising software processes.

53. The apparatus of claim 47, the multicast input processing routine comprising:

determining whether a multicast message having the CC value of the received multicast message has been previously received by the multicast receiving processing node;

if so, determining whether the multicast receiving processing node has already processed the received multicast message, and if not, scheduling the received multicast message for subsequent processing by the multicast receiving processing node;

if not, performing steps comprising:

setting the multicast receiving processing node's CC to the received multicast message's CC value;

sending an acknowledgement message to all processing nodes in said multicast receiving processing node's membership view; and setting a timer to expire in a predetermined duration, the timer being exclusively associated with the received multicast message's CC value.

54. The apparatus of claim 53, the acknowledgement message including the received multicast message's CC value and source-ID, the multicast receiving processing node's source-ID, and the source-ID of the received multicast message.

55. The apparatus of claim 53, the scheduling of the received multicast message for subsequent processing by the multicast receiving processing node comprising:

inserting the received multicast message into a queue.

56. The apparatus of claim 47, the method further comprising:

each processing node maintaining a queue containing received messages for processing by that processing node, the messages being ordered according to their CCs.

57. The apparatus of claim 56, the messages being secondarily ordered according to source-IDs.

58. The apparatus of claim 56, the method further comprising:

each processing node repeatedly processing messages from its queue until the queue is empty.

59. The apparatus of claim 56, where, further responsive to receipt of a stimulus message at any one of the processing nodes, the stimulus receiving processing node inserts the stimulus message into the stimulus receiving processing node's queue.

60. The apparatus of claim 47, wherein:

each processing node maintains a queue containing received messages for processing by the processing node;

responsive to completion of a membership protocol, each processing node performs steps comprising:

updating the processing node's membership view in accordance with the completed membership protocol;

purging the processing node's queue of messages from any processing nodes absent from the processing node's updated membership view.

* * * * *